United States Patent Office 3,539,606
Patented Nov. 10, 1970

3,539,606
ISONITRILE CARBONYL DERIVATIVES OF CHROMIUM, MOLYBDENUM AND TUNGSTEN
Henry Drummond Murdoch, Ashtead, Surrey, England, and Fausto Calderazzo, Pescia, Italy, assignors to American Cyanamid Company, Stamford, Conn., a corporation of Maine
No Drawing. Continuation-in-part of application Ser. No. 544,113, Apr. 21, 1966. This application Apr. 21, 1969, Ser. No. 818,132
Int. Cl. C07f 11/00; C23c 11/04; C07c 119/02
U.S. Cl. 260—429
13 Claims

ABSTRACT OF THE DISCLOSURE

A new process for producing isonitrile complexes of carbonyls of the transition metals molybdenum, chromium and tungsten is disclosed as are the new isonitrile complexes themselves.

---

This application is a continuation-in-part of application Ser. No. 544,113, filed Apr. 21, 1966, now abandoned.

This invention relates to a new process of producing isonitrile complexes of carbonyls of the transition metals molybdenum, chromium and tungsten, and to the new products themselves.

It has been proposed to produce complexes by reacting the metal hexacarbonyls with isonitriles at high temperatures. This has only been successful with some aryl isonitriles and cannot be used with alkyl isonitriles or alicyclic isonitriles. Also, an indirect method has been followed to obtain tris (isonitrile) tricarbonyl metals by reacting the corresponding tris amine tricarbonyl metals with isonitriles. This indirect method is cumbersome and expensive. Essentially, the present invention involves reacting with an isonitrile a compound having the formula:

$$[Z]^+[M(CO)_5X]^-$$

wherein
$[Z]^+$ is a cation;
M is a metal selected from the group consisting of chromium, molybdenum and tungsten; and
X is a halogen selected from the group consisting of chlorine, bromine and iodine.

As the reaction is with the anion, the particular nature of the cation is of relatively minor significance, so long as it does not interfere with the reaction by reactivity with other reagents; and therefore the present invention is not limited to any particular cations. In the specific examples, a very convenient cation, namely tetraethylammonium, will be referred to, but the invention is in no sense limited thereto and other cations, such as those derived from strongly electropositive metals, other quanternary ammonium ions and the like may be used. The reaction produces mono(isonitrile)pentacarbonyl complexes, bis(isonitrile)tetracarbonyl complexes, and tris(isonitrile)tricarbonyl complexes in varying ratios depending on the reaction conditions as will be set out below. It is also possible in most cases to produce intermediate products in which the halogen has not been removed, though these compounds are less stable and their isolation in pure form is not as readily effected.

It is an important advantage of the present invention that the reactions proceed at relatively low temperature, not exceeding subsantially 45° C. and in many cases preferably at substantially room temperature. This is particularly true with the chromium and molybdenum complexes, though the tungsten complexes react somewhat better at about 45° C. This is still a far cry from the high temperatures which were used with the hexacarbonyls and which were in excess of 100° C.

Preferably the reaction is carried out with the compound having the anionic halopentacarbonyl metal in the preformed state. However, it is possible to react a halide of the cation used, such as for example a quaternary halide, with the metal hexacarbonyl to porduce the pentacarbonyl complex in situ. Such modifications of the reaction procedure are therefore included within the invention.

While it is not desired to limit the present invention to a particular theory or reaction mechanism, checks by means of infrared spectrum as the reaction proceeds and other factors strongly indicate that the reaction scheme set out below is correct, and it is therefore presented as having a high degree of probability but not a complete certainty. The following reaction mechanism is suggested:

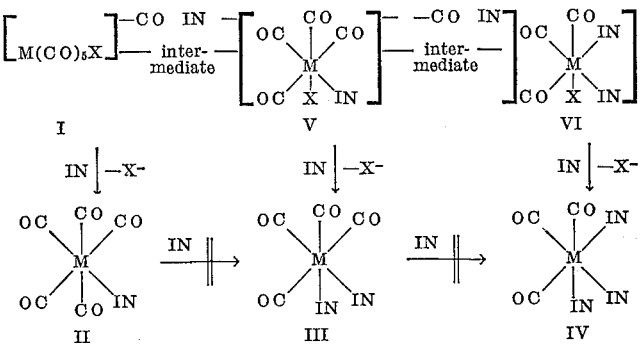

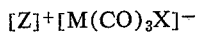

The various products will be referred to in the remainder of the specification by their Roman numbers and M is either molybdenum, chromium or tungsten; X chlorine, bromine or iodine; and IN isonitrile.

It will be noted that the bis-isonitrile complex, III, theoretically presents the possibility of cis-trans isomerism. However, in the reaction of the present invention only the cis form has been observed and attempts to transform it into the trans form by high temperature in solution resulted only in disproportionation to give mono and tris products.

The tris-isonitrile complexes which, as has been pointed out above have been produced, are yellow, air stable, crystalline solids. The new mono and bis isonitrile complexes producible by the present invention have similar physical properties and are useful for the same purposes as the tris complexes. The complexes in which the halogen has not been removed, compounds V and VI, are much darker in color, less stable, and are useful primarily as intermediates for producing the final products.

It is an advantage of the present invention not only that the reaction conditions are quite mild but also the yields are very high; in most cases the actual reaction proceeds almost quantitatively, losses being primarily in the purification steps, which in some cases do not permit quantitative separation.

The particular metal involved does not seem to make a great deal of difference in the reaction or in yields except that the chromium and molybdenum halopentacarbonyls are more reactive at the lower temperatures, the tungsten compounds reacting best at temperatures in the 40's, with temperatures as high as 80° C. still possible. The lower reactivity of the tungsten pentacarbonyl anions made the isolation of the intermediate complexes V possible (see Examples 4 and 5).

The halogen X, contained in the starting $[M(CO)_5X]^-$ anions, is not without influence.

Reaction rates and degree of substitution depend largely on X. When the reactions are carried out in tetrahydrofuran as a reaction medium, the iodopentacarbonylmetal anions give only mono- and bis-derivatives, with the former predominating. When the chloropentacarbonylmetal anion is present, there is practically no mono-product, the products being mainly bis- and tris-products. The bromopentacarbonylmetal anion is intermediate in its reactivity and produces primarily the bis-complexes in high yield with only traces of the tris-product. The different reactivities of the different anions depending on the halogen present in it, permit very desirable choice of reaction conditions to produce predominantly one or the other of the complexes. This gives great flexibility to the process of the present invention and constitutes an important practical advantage.

The effect of isonitrile concentration has also an influence on the final products obtained. An increased production of the mono(isonitrile)pentacarbonylmetals with an increasing isonitrile concentration has been observed experimentally, in agreement with the proposed reaction mechanism.

It would also be expected from theoretical considerations that an increase in CO pressure would tend to inhibit the formation of V and so favor the production of the monoisonitrile complex. Experiment has shown that this is in fact the case.

The effect of different solvents has also been studied, although not exhaustively. In the case of the reaction of tetraethylammonium iodopentacarbonylmolybdenum with cyclohexylisonitrile, the ratio of mono- to bis-products is changed markedly. Tetrahydrofuran and diglyme, which with hexacarbonylmetals have been found to facilitate elimination of CO, produce a much smaller ratio of mono- to bis- than is the case with chloroform, methylene chloride, or nitromethane. This effect appears to be a specific solvent effect and not one of the dielectric constant, for the first two solvents have constants of 7.6 and 5.7 respectively while the last three are 4.8, 9.0, and 34 respectively. The reaction is also markedly faster in the last three solvents.

It has been found that the nature of the isonitrile itself does not have a great effect when reacting with the iodopentacarbonylmetal anions, there being little difference between cyclohexyl- and phenyl-isonitriles. However, in the case of the chloro-complexes, the formation of the tris(isonitrile)tricarbonylmetals is favored in the case of the phenylisonitrile. It is thus possible to vary the relative proportions of the products by changing reactant concentration. For example, with a large excess of cyclohexylisonitrile reacting with tetraethylammonium iodopentacarbonylmolybdenum in methylene chloride, under a CO atmosphere, there is produced almost exclusively the mono (cyclohexylisonitrile)pentacarbonylmolybdenum. General effects may be summarized by the following table:

TABLE 1.—REACTION CONDITIONS FOR SPECIFIC PRODUCT

| | Product required | | |
|---|---|---|---|
| | Mono- | Bis- | Tris- |
| Reactant | $[M(CO)_5I]^-$ | $[M(CO)_5Br]^-$ | $[M(CO)_5Cl]^-$ |
| Solvent | $CH_2Cl_2$ | THF, diglyme | THF, diglyme. |
| Atmosphere | CO (1 atm.) | Reduced pressure | Reduced pressure. |
| Isonitrile conc. | High | Low | Low. |

The invention will be described in more detail in conjunction with the specific examples in which parts are by weight unless otherwise specified, and the reactions were carried out under an atmosphere of pure nitrogen unless otherwise stated. Crystallizations however, were effected in air. All melting points are uncorrected.

Since the process is a general one with all of the products, only general reaction conditions will be described, the particular reactants and the product charactertistics being summarized in a table following the examples.

EXAMPLE 1

4 millimoles of tetraethylammonium idopentacarbonylmetal were dissolved in 75 ml. of tetrahydrofuran and 4.8 millimoles of isonitrile added, the mixture being stirred at room temperature (for Cr and Mo), and at 45° C., (for W), under 1 meter water vacuum until reaction was complete, which normally took from 3 to 5 hours. Reaction progress was followed by infrared, using the band for the starting complex at $\sim$2060 cm.$^{-1}$ as reference.

The reaction mixture was then filtered and the solvent removed under reduced pressure. The residual solid was then triturated with a minimum amount of petroleum ether which eliminates the mono-substituted product together with some of the bis-product. The residue was then crystallized from a methylene chloride-petroleum ether mixture to give the bis(isonitrile)tetracarbonylmetal.

The petroleum ether fraction was evaporated to dryness and the mono(isonitrile)pentacarbonylmetal was then purified by sublimation at 60° C. under 0.1 mm. (Mo, W) or 45° C. under the same pressure, (Cr). Traces of hexacarbonylmetal formed were eliminated from the sublimed mono(isonitrile) pentacarbonylmetals by dissolving the mixture in petroleum ether and evaporating the solvent at 12 mm. The hexacarbonylmetal is eliminated with the solvent.

The residue from the sublimation contained almost pure bis-product, which was recrystallized as described above. In all of the reactions carried out as above, the ratio of mono- to bis- was approximately 2:1 with small variations from chromium to tungsten and from cyclohexyl to phenylisonitrile. The reaction conditions described above will be referred to as standard.

EXAMPLE 2

To a solution of 5 millimoles of the chromium or molybdenum tetraethylammonium chloropentacarbonylmetal anion in 150 ml. of tetrahydrofuran was added 12 millimoles of isonitrile and the mixture stirred at room temperature until reaction was complete by infrared check as described in Example 1.

The reaction mixture was filtered, the solvent evaporated, and the solid residue triturated with petroleum ether to remove traces of the mono-isonitrile complex, The bis- and tris- products remaining were then separated by fractional crystallization from a methylene chloride-petroleum ether mixture, the tris-product being less soluble for the phenylisonitrile derivatives and more soluble for the cyclohexylisonitrile derivatives. The separation was more difficult than the corresponding separation of mono- and bis-products described in Example 1 and was rarely completely quantitative. With cyclohexylisonitrile the ratio of bis- to tris-products was about 1:1, while for phenylisonitrile the ratio was about 1:3, with only small variations between the chromium and molybdenum compounds.

EXAMPLE 3

The procedure of Example 2 was repeated substituting the bromopentacarbonylmetal anions for the chloropentacarbonylmetal anions. The ratio of bis- to tris-product in the mixture was greatly enhanced. The two products were separated as described above.

EXAMPLE 4

The general conditions of Example 2 were followed using tetraethylammonium chloropentacarbonyl tungsten and cyclohexylisonitrile. On completion of the reaction, determined as described above, the mixture was filtered, and a large volume of petroleum ether added. The precipitated solid was then crystallized from a tetrahydrofuran-petroleum ether mixture; the tetraethylammonium chloro-(cyclohexylisonitrile) tetracarbonyltungsten was obtained as an orange solid in good yield. The mother liquors from the reaction contained the bis- and tris-isonitrile derivatives. When the reaction was carried out at 45° C. instead of at room temperature, it proceeded smoothly and produced the normal reaction mixture of mono-, bis- and tris-products, which were separated as described in Example 2 for the chromium and molybdenum products.

When reacting at room temperature and isolating the tetraethylammonium chloro(cyclohexylisonitrile) tetracarbonyl tungsten, this intermediate compound (V) was then reacted with cyclohexylisonitrile and tetrahydrofuran at 45° C. A mixture of bis- and tris-isonitrile derivatives was obtained and, as expected, no mono-. The intermediate is a deep red-orange, whereas the final product is a yellow solid.

EXAMPLE 5

The procedure of Example 4 was repeated, substituting phenylisonitrile for the cyclohexylisonitrile. The reaction mixture at room temperature immediately deepened in color from yellow to dark orange, and tetraethylammonium chloro-bis(phenylisonitrile)tricarbonyltungsten was precipitated out as a deep red-orange solid. This was filtered off, washed with water and a minimum of tetrahydrofuran and then dried. This intermediate could not be purified by recrystallization as this resulted in disproportionation of the material.

The intermediate was further reacted with phenylisonitrile in nitromethane at 45° C., producing tetraethylammonium chloride and tris(phenylisonitrile) tricarbonyltungsten as the sole products.

When the intermediate material was dissolved in methylene chloride without isonitrile, the color gradually changed from red to yellow and tetraethylammonium chloride was precipitated. From the solution tetraethylammonium chloro(phenylisonitrile)tetracarbonyltungsten was isolated by precipitation with petroleum ether and purified as described below. The mother liquors contained tris(phenylisonitrile)tricarbonyltungsten from which this compound was isolated.

The filtrate of the initial reaction was treated with petroleum ether, which caused precipitation, and after recrystallization from a tetrahydrofuran-petroleum ether mixture the tetraethylammonium chloro(phenylisonitrile) tetracarbonyltungsten was obtained as a dark yellow solid. When it was reacted with further phenylisonitrile at 45° C., a mixture of bis- and tris(phenylisonitrile) derivatives were obtained as described above.

When the initial reaction was carried out at 45° C., an insoluble material was obtained as a precipitate. However, no tetraethylammonium chloro(phenylisonitrile)-tetracarbonyltungsten was obtained, the reaction proceeding to the bis- and tris-isonitrile derivatives, which were separated as described above.

EXAMPLE 6

Attempts were made to convert mono(cyclohexylisonitrile)pentacarbonylmolybdenum to the bis-product by allowing the solution in tetrahydrofuran with a large excess of cyclohexylisonitrile to stand for 48 hours. No trace of the bis-product was observed.

In a similar manner, the bis(cyclohexylisonitrile)tetracarbonylmolybdenum in tetrahydrofuran was allowed to stand at room temperature with a large excess (10 molar) of the isonitrile, and again no transformation of the bis- to the tris- took place.

Bis(cyclohexylisonitrile)tetracarbonylmolybdenum and the corresponding chromium compound were heated in solution in heptane; first to 50° C. for 1 hour and then at 60°–70° C. The infrared spectra was unchanged.

Heating the molybendum product in decaline to 130°–150° C. produced some disproportionation to mono- and tris-products and extensive decomposition.

EXAMPLE 7

The effects of different solvents was studied by reacting tetraethylammonium iodopentacarbonylmolybdenum with cyclohexylisonitrile under the standard conditions of Example 1 in a variety of solvents. In methylene chloride and nitromethane a substantial increase in the mono-product, more than 40%, was noted in comparison with the results in tetrahydrofuran. With diglyme the product ratio was somewhat lower than with the standard reaction conditions in tetrahydrofuran.

When the reaction was carried out with an excess of cyclohexylisonitrile (10 times standard), in methylene chloride under carbon monoxide pressure a still higher yield of mono(cyclohexylisonitrile)pentacarbonylmolybdenum was obtained.

The following table shows the various products obtained with different reactants when following the conditions of the Examples 1 and 2 and in the case of the last three compounds, Examples 3 and 4.

TABLE 2

| Compound: | M.P. |
|---|---|
| $(PhNC)Mo(CO)_5$ | 74° |
| $(PhNC)_2Mo(CO)_4$ | 104° |
| $(PhNC)_3Mo(CO)_3$ | 141° |
| $(C_6H_{11}NC)Mo(CO)_5$ | 86° |
| $(C_6H_{11}NC)_2Mo(CO)_4$ | 108° |
| $C_6H_{11}NC)_3Mo(CO)_3$ | 116° |
| $(PhNC)W(CO)_5$ | 80° |
| $(PhNC)_2W(CO)_4$ | 116° |
| $(PhNC)_3W(CO)_3$ | 145–6° |
| $(C_6H_{11}NC)W(CO)_5$ | 76° |
| $(C_6H_{11}NC)_2W(CO)_4$ | 107° |
| $(C_6H_{11}NC)_3W(CO)_3$ | 121° |
| $(PhNC)Cr(CO)_5$ | 55–6° |
| $(PhNC)_2Cr(CO)_4$ | 87–8° |
| $(PhNC)_3Cr(CO)_3$ | 108–9° |
| $(C_6H_{11}NC)Cr(CO)_5$ | 49° |
| $(C_6H_{11}NC)_2Cr(CO)_4$ | 95–6° |
| $(C_6H_{11}NC)_3Cr(CO)_3$ | 97° |
| $Et_4N[(PhNC)W(CO)_4Cl]$ | 88° |
| $Et_4N[(C_6H_{11}NC)W(CO)_4Cl]$ | 67–8° |
| $Et_4N[(PhNC)_2W(CO)_3Cl]$ | 134–5° |

EXAMPLE 8

The process of Examples 1 and 2 was repeated, using butylisonitrile instead of cyclohexylisonitrile. The reaction proceeded in the same manner and good yields of the corresponding butyl products were produced. The behavior of the butyl nitrile resembles more closely that of the cyclohexyl nitriles than phenylisonitrile.

As indicated hereinabove, the mono and bis isonitrile complexes of this invention are useful for the same purposes as the tris complexes and can be utilized as fuel additives and in metal plating, i.e., the production of metallic films or mirrors.

In this connection, tricarbonyl tris(phenylisocyanide) chromium (O) containing minor amounts of the corresponding dicarbonyl complex was introduced into a suitable device and heated gradually from 90° C. to 500° C. in an oil bath under a vacuum of 15 mm. of mercury. Decomposition commenced at about 110° C. Phenylisocyanide collected on the cold part of the apparatus and metallic chromium was left in the bottom of the tube. After about 30 minutes of heating the reaction vessel was cooled to room temperature. Subsequently the black chromium metal was oxidized in air to give green $Cr_2O_3$.

We claim:

1. A process for preparing isonitrilecarbonyl complexes of metals selected from the group consisting of chromium, molybdenum and tungsten, which comprises reacting at temperatures below 80° C. a compound represented by the formula:

$$[Z]^+[M(CO)_5X]^-$$

wherein

[Z]⁺ is a cation;

M is a metal as described above; and

X is a halogen selected from the group consisting of chlorine, bromine, and iodine; with an isonitrile, and recovering the isonitrilecarbonylmetal complex obtained.

2. A process according to claim 1 in which the metal is chromium and wherein the product obtained is a mono-isonitrilepentacarbonyl chromium metal complex.

3. A process according to claim 1 in which the metal is selected from the group consisting of chromium and molybdenum and the temperature is approximately room temperature.

4. A process according to claim 1 in which the metal is tungsten and the temperature is between 40° and 80° C.

5. A process according to claim 1 in which the reaction is carried out in a carbon monoxide atmosphere under pressure and the product is predominantly the mono-isonitrile-pentacarbonylmetal complex.

6. A process according to claim 1 in which the halogen of the anionic halopentacarbonylmetal is iodine.

7. A process according to claim 1 in which the halogen of the anionic halopentacarbonylmetal complex is chlorine.

8. A process according to claim 6 in which the metal is tungsten, the temperature is approximately room temperature, and the produce is predominantly mono-isonitrile-iodotetracarbonyltungsten.

9. A process according to claim 8 in which the product of claim 6 is further treated with isonitrile at temperatures between 40 and 80° C. to produce bis- and tris-isonitrile complexes.

10. A mono-cyclohexyl isonitrile pentacarbonyl complex of a metal selected from the group consisting of chromium, molybdenum and tungsten.

11. A complex according to claim 10 wherein the metal is chromium.

12. A quaternary ammonium iodoisonitriletetracarbonyltungsten.

13. Bis-isonitrile-tetracarbonyl and tris-isonitrile-tricarbonyl metal complexes of chromium, molybdenum and tungsten in which the isonitrile is cyclohexylisonitrile.

References Cited

Murdoch et al., J. Organometal. Chem., 5 (1966), pp. 166–175.

TOBIAS E. LEVOW, Primary Examiner

A. P. DEMERS, Assistant Examiner

U.S. Cl. X.R.

23—203; 44—68; 117—107.2; 260—438.5, 464

UNITED STATES PATENT OFFICE
CERTIFICATE OF CORRECTION

Patent No. 3,539,606    Dated November 10, 1970

Inventor(s) HENRY DRUMMOND MURDOCH AND FAUSTO CALDERAZZO

It is certified that error appears in the above-identified patent and that said Letters Patent are hereby corrected as shown below:

Column 1, line 59, cancel "$[Z]+[M(CO)_3X]^-$" and substitute -- $[Z]+[M(CO)_5X]^-$ --

SIGNED AND SEALED
MAR 2 1971

(SEAL)
Attest:

Edward M. Fletcher, Jr.
Attesting Officer

WILLIAM E. SCHUYLER,
Commissioner of Patents